(12) United States Patent
Candee et al.

(10) Patent No.: US 6,490,595 B1
(45) Date of Patent: Dec. 3, 2002

(54) METHOD, SYSTEM AND PROGRAM PRODUCTS FOR PROVIDING EFFICIENT SYNCPOINT PROCESSING OF DISTRIBUTED TRANSACTIONS

(75) Inventors: Juliet C. Candee, Danbury, CT (US); Steven J. Greenspan, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/538,920

(22) Filed: Mar. 30, 2000

(51) Int. Cl.⁷ .............................................. G06F 17/30
(52) U.S. Cl. ...................................................... 707/202
(58) Field of Search ................................. 707/202, 203; 395/200

(56) References Cited

U.S. PATENT DOCUMENTS

| | | | |
|---|---|---|---|
| 5,115,392 A | 5/1992 | Takamoto et al. | 395/650 |
| 5,317,739 A | 5/1994 | Elko et al. | 395/650 |
| 5,327,532 A * | 7/1994 | Ainsworth et al. | 395/200 |
| 5,335,343 A | 8/1994 | Lampson et al. | 395/575 |
| 5,469,562 A | 11/1995 | Saether | 395/182.18 |
| 5,734,897 A | 3/1998 | Banks | 395/618 |
| 5,737,600 A | 4/1998 | Geiner et al. | 395/616 |
| 5,778,388 A * | 7/1998 | Kawamura et al. | 707/203 |
| 5,832,508 A | 11/1998 | Sherman et al. | 707/200 |
| 5,870,757 A | 2/1999 | Fuller | 707/201 |
| 5,890,154 A | 3/1999 | Hsiao et al. | 708/8 |
| 5,920,875 A | 7/1999 | Clark et al. | 707/206 |
| 5,999,935 A | 12/1999 | Clark et al. | 707/101 |
| 6,092,086 A * | 7/2000 | Martin et al. | 707/202 |

* cited by examiner

*Primary Examiner*—Wayne Amsbury
*Assistant Examiner*—Cam-Linh T. Nguyen
(74) *Attorney, Agent, or Firm*—Andrew J. Wojnicki, Jr.; Lily Neff, Esq.; Heslin Rothenberg Farley & Mesiti P.C.

(57) ABSTRACT

Syncpoint processing is performed for a distributed transaction. The distributed transaction includes a plurality of units of recovery, and syncpoint processing is performed for at least a portion of the units of recovery, without passing messages between the units of recovery of the at least a portion of the plurality of units of recovery. Instead, syncpoint processing (including transactional logging) is controlled by one syncpoint manager associated with one of the units of recovery, and that unit of recovery collects information representative of the other units of recovery.

42 Claims, 9 Drawing Sheets

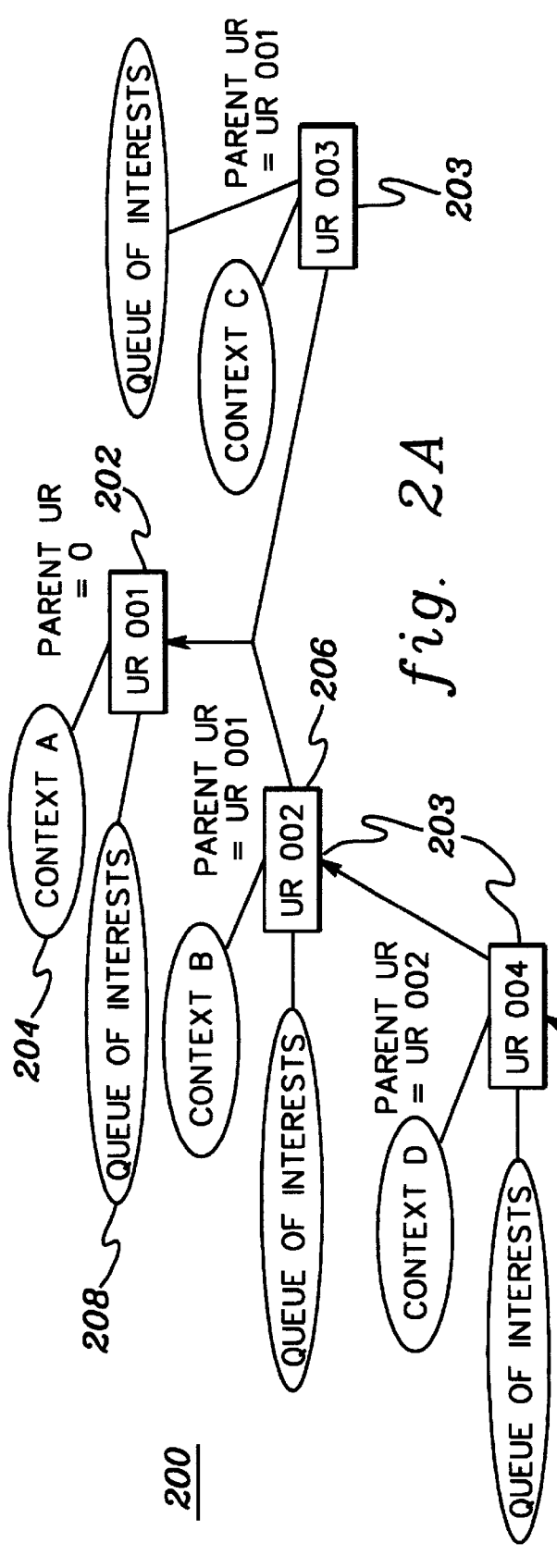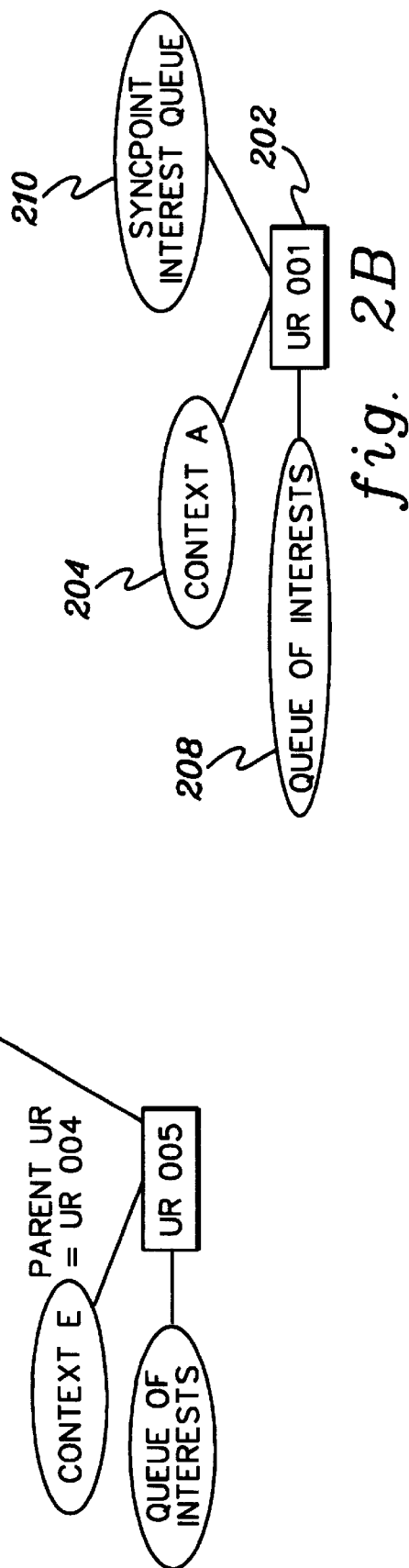
fig. 2A
fig. 2B

METHOD, SYSTEM AND PROGRAM PRODUCTS FOR PROVIDING EFFICIENT SYNCPOINT PROCESSING OF DISTRIBUTED TRANSACTIONS

TECHNICAL FIELD

This invention relates, in general, to the processing of distributed transactions, and in particular, to avoiding message passing between units of recovery of a distributed transaction when performing syncpoint processing for the distributed transaction.

BACKGROUND OF THE ART

A transactional program running in one transaction monitor subsystem environment may require that resources be updated by a transactional program running in another subsystem environment. The other subsystem environment may be similar to the originating subsystem or different. In either of these cases, the separate programs are often tied together into a single transaction by using a distributed transaction protocol.

Distributed transaction protocols allow one transactional program to invoke other transactional programs, which reside either locally or non-locally to the initiating transactional program. The initiating transaction subsystem is referred to as the initiator, and the initiated transaction subsystems are referred to as agents. The initiator and all of the agents in a transaction are referred to herein as a coordinating group.

Further, distributed transaction protocols normally require that each participating subsystem participate in syncpoint processing, which includes performing transaction logging, for committed transactions. The initiating system typically has to harden (force to a persistent media) a commit record and each agent hardens at least an in-doubt record and a commit record. Some protocols even require additional log writes. When the initiator and the agents are in different systems, these log writes are needed so that transaction recovery will work, if any of the systems or the communication between the systems fails. When the initiator and the agents are on the same system, these log forces are still performed and used for recovery.

In one example, the syncpoint processing is performed using a technique that requires the various members in a coordinating group to communicate with one another during the syncpoint processing. This communication is even necessary when the various members in the coordinating group are controlled by the same transaction monitor subsystem. This is because in a distributed transaction the various members of a coordinating group act separately. Thus, messages are still passed among the members of the coordinating group, even when the members are the same transaction subsystem.

This communication during the syncpoint processing is very expensive. Thus, a need exists for an efficient technique for performing syncpoint processing of distributed transactions. In particular, a need exists for a technique that reduces communication between members of a coordinating group during the syncpoint process.

SUMMARY OF THE INVENTION

The shortcomings of the prior art are overcome and additional advantages are provided through the provision of a method of performing syncpoint processing for distributed transactions of a computing environment. The method includes, for instance, executing a distributed transaction, in which the distributed transaction includes a plurality of units of recovery; and performing syncpoint processing for at least a portion of the plurality of units of recovery. The syncpoint processing is performed without passing messages between the at least a portion of the plurality of units of recovery.

In a further example, the performing of syncpoint processing includes employing a single unit of recovery of the plurality of units of recovery to represent the at least a portion of the plurality of units of recovery in the syncpoint processing.

In one example, interests of the at least a portion of the plurality of units of recovery are copied to the single unit of recovery to be used during the syncpoint processing. In other examples, one or more exits are driven from the single unit of recovery to at least initiate one or more phases of the syncpoint processing for the at least a portion of the plurality of units of recovery. In yet a further example, one or more votes for the at least a portion of the plurality of units of recovery are collected at the single unit of recovery. The one or more votes are responsive to the one or more exits.

In another aspect of the present invention, a method of performing syncpoint processing for distributed transactions of a computing environment is provided. The method includes, for instance, executing a distributed transaction, the distributed transaction comprising a plurality of units of recovery; and performing syncpoint processing for at least a multiple of the plurality of units of recovery, wherein a single syncpoint manager of the computing environment controls the syncpoint processing for the at least a multiple of the plurality of units of recovery.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2a depicts one example of a cascaded unit of recovery (UR) family tree, in accordance with an aspect of the present invention;

FIG. 2b depicts one example of a node of the tree of FIG. 2a, including various queues associated therewith, in accordance with an aspect of the present invention;

BEST MODE FOR CARRYING OUT THE INVENTION

In accordance with an aspect of the present invention, syncpoint processing (e.g., two-phase commit processing) is performed for at least a portion of a distributed transaction without requiring message passing between the units of recovery (or nodes) associated with that portion of the distributed transaction. For example, a distributed transaction includes a plurality of units of recovery, each of which has a syncpoint manager associated therewith. One of those managers is selected to control the syncpoint processing (including transaction logging) for one or more other syncpoint managers of the distributed transaction, without having those other managers communicate with one another to control the syncpoint processing. This provides for efficient syncpoint processing of distributed transactions, particularly when at least a portion of the transaction is located on one system of a computing environment.

Figure 1:
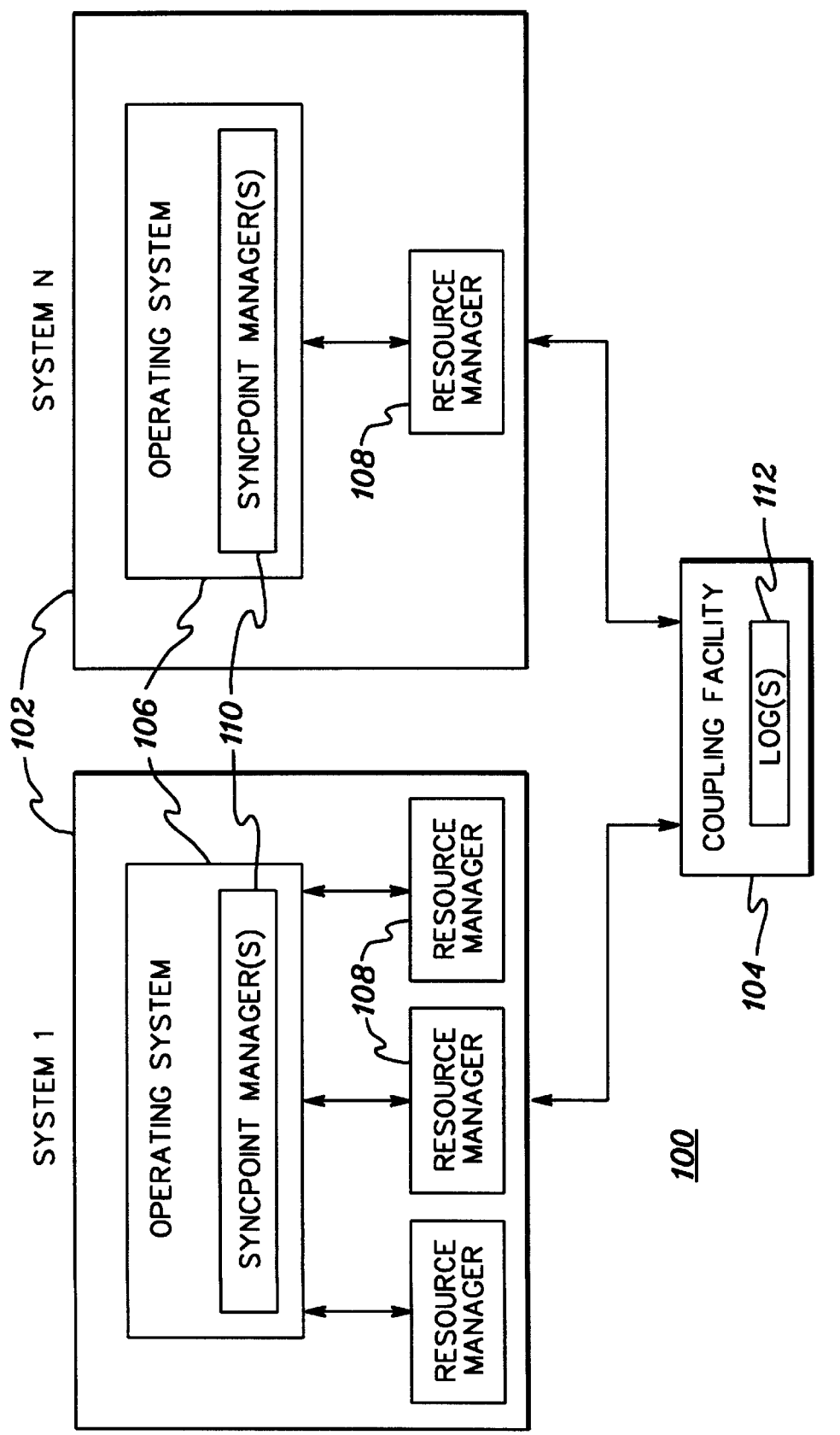
FIG. 1 depicts one example of a computing environment incorporating and using aspects of the present invention.

One example of a computing environment incorporating and using the capabilities of the present invention is depicted in FIG. 1 and described in detail herein. In one example, computing environment 100 is based on the Enterprise Systems Architecture (ESA)/390 offered by International Business Machines Corporation, Armonk, N.Y., and includes one or more systems 102 coupled to a coupling facility 104. Each system 102 includes an operating system 106 and one or more resource managers 108, each of which is described below.

In one embodiment, operating system 106 is, for instance, the OS/390 (or Multiple Virtual Storage (MVS)) operating system offered by International Business Machines Corporation. Operating system 106 includes, for instance, one or more syncpoint managers 110.

In one example, a syncpoint manager coordinates participants (such as resource managers) in a 2-phase commit protocol used for ensuring that all changes made to the data are completed or undone. One example of a syncpoint manager is a Resource Recovery Service (RRS), which is offered by International Business Machines Corporation. A syncpoint manager is involved in various aspects of the present invention, as described below.

Each of resource managers 108 owns and controls a set of resources within the computing environment. For instance, the resource manager can be a database management facility, such as IMS or DBN2, each of which is offered by International Business Machines Corporation.

Each system 102 is coupled to coupling facility 104. Coupling facility 104 is a shareable facility that contains storage accessible by the systems and performs operations requested by the resource managers and/or programs running within the systems. In one embodiment, coupling facility 104 is a structured-external storage processor (SES). Examples of a coupling facility are described in detail in U.S. Pat. No. 5,317,739, entitled "Method and Apparatus for Coupling Data Processing Systems," by Elko et al., issued May 31, 1994; and in U.S. Pat. No. 5,737,600, entitled "Method And System For Log Management In A Coupled Data Processing System," by Geiner et al., issued Apr. 7, 1998, both assigned to International Business Machines Corporation, and each of which is hereby incorporated herein by reference in its entirety.

Coupling facility 104 includes one or more logs 112. The logs hold, for instance, transactional information usable in recovery situations, and are accessible by one or more of the plurality of systems of the computing environment.

Although in the embodiment depicted herein, the logged information is located within a coupling facility, this is only one example. The logged information can also be stored within memory of one or more of the systems, within external storage, such as direct access storage devices (DASD), or within any combination thereof. Further, the invention need not be employed in a multisystem environment. The invention is applicable to a single system with or without a coupling facility.

The computing environment is used to execute one or more distributed transactions, each of which typically involves multiple resource managers using a two-phase commit process to ensure atomic, consistent, isolated and durable properties of the transaction. The distributed transaction is represented as a set of units of recovery (URs). Each unit of recovery is a set of changes on one node (defined below) that is committed or backed out as part of the transaction. A UR is explicitly started, or implicitly started the first time a resource manager touches a protected resource on a node, and ends when the two-phase commit process for the transaction changing it completes. Although a distributed transaction has a plurality of units of recovery, all or a portion of those units of recovery may be executed within a single system (e.g., System 1).

Each unit of recovery is associated with a single piece w of work being executed within a subsystem environment, and each piece of work is represented by a work context. Each unit of recovery and its associated work context can be owned and managed by either the same or different work managers. (A work manager is a resource manager that controls the execution of at least one application program.) This allows different work managers to manage separate programs on behalf of a single overall transaction. Further, each unit of recovery is controlled or managed by a syncpoint manager. There may be different syncpoint managers for each unit of recovery or one or more of the units of recovery may have the same syncpoint manager. All units of recovery in a distributed transaction commit or backout as a group.

A node is a set of changes to protected resources made by a single work request in a single execution environment. In RRS, a unit of recovery is associated with a work context to form a single transaction node. Multiple nodes may be connected through distributed transaction protocols. A set of units of recovery (or nodes) is represented, in accordance with an aspect of the present invention, as a cascaded unit of recovery family. A cascaded UR family represents the whole or a part of a single distributed transaction.

The cascaded UR family relationship ensures that the protected resources modified by the separate application programs are coordinated as a single transaction. This type of transaction is referred to herein as a cascaded transaction. One example of a cascaded unit of recovery family is depicted in FIG. 2a.

Referring to FIG. 2a, a cascaded UR family 200 includes a top-level UR 202 (e.g., UR 001) and one or more other URs 203 (e.g., UR 002, UR 003, etc.). A top-level UR is a parent UR with no parents. The top-level UR is initiated by a work manager running in the local environment of the transaction. The work manager obtains an initial work context 204 that represents the work request and informs the syncpoint manager to create a UR to represent the part of the transaction being done by the work request. Creation of a UR is further described in OS/390 MVS Programming: Resource Recovery, IBM Publication No.: GC28-1739-04, Sep. 1999, which is hereby incorporated herein by reference in its entirety.

When the work request moves from the execution environment of the original work manager into another work manager's environment, the second work manager can obtain a new work context and can inform the syncpoint manager to create a new UR for the new work context, which is cascaded from the original UR. The new UR is a child UR 206 of the parent UR. A child UR is referred to herein as a cascaded UR. Multiple URs can be cascaded from the same parent UR. These URs are called siblings. In the example of FIG. 2a, UR 002 and UR 003 are siblings.

Each UR has associated therewith a queue of interests 208. This queue indicates for that particular UR, which, if any, resource managers have an interest in that unit of recovery. An interest indicates that the resource manager had protected resources it manages, examined or modified by the work request. Additionally, the top-level UR has a syncpoint interest queue 210 (FIG. 2b) associated therewith. This queue holds all of the interests of the units of recovery, as described further below.

The top-level UR and all of its children together are called a cascaded UR family. In one example, the cascaded family is represented by a hierarchical tree, as shown in FIG. 2a. The tree is maintained, for example, in a depth-first order. (In other embodiments, dept-first ordering is not necessary.) That is, each child UR is shown below its parent UR, and the tree is initially traversed by traveling down one leg of the tree. Then, traversal continues by backing up to the first split encountered in the tree, and traveling down the next leg of the tree, and so on.

Figure 3:
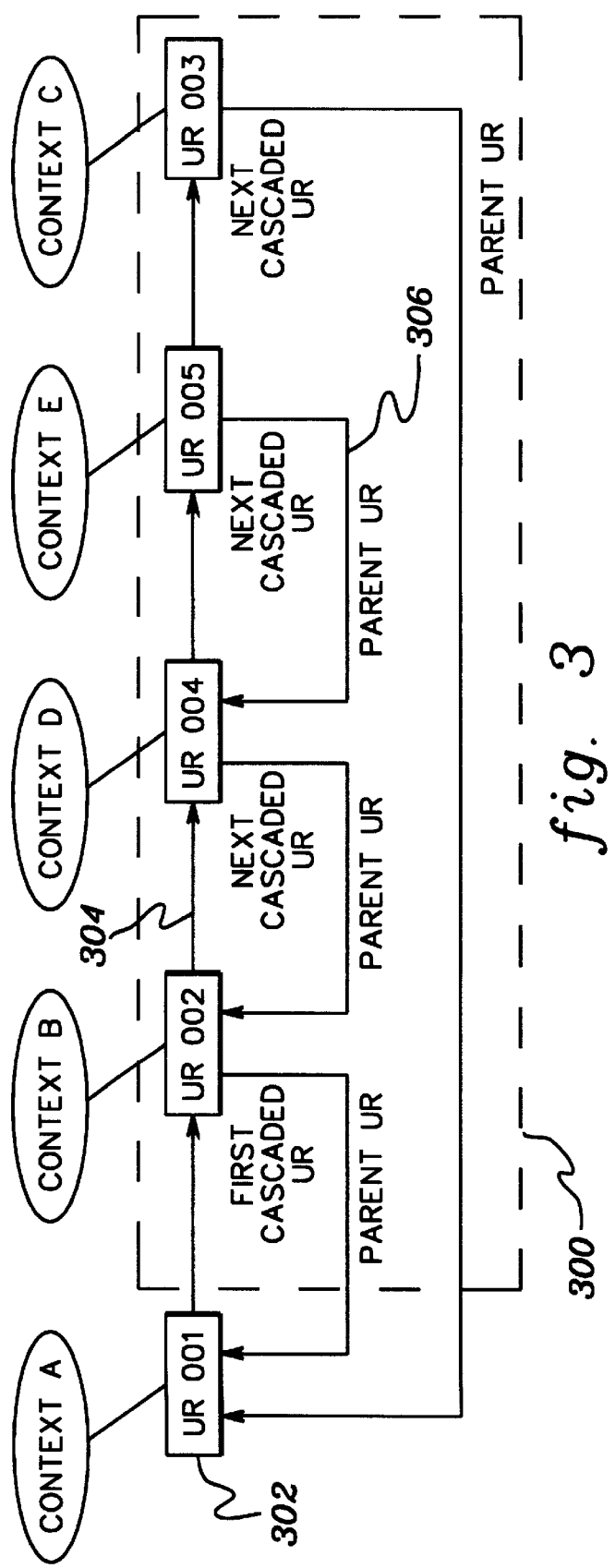
FIG. 3 depicts one example of a cascaded unit of recovery family data structure, in accordance with an aspect of the present invention.

The cascaded URs and possibly other ancestors, are chained to a cascaded UR data structure. In one example, this data structure is a queue, which is, instantiated in the top-level UR only. One example of such a queue is depicted in FIG. 3.

A cascaded UR family queue 300 includes, for instance, one or more units of recovery of the cascaded UR family. For example, queue 300 includes UR 002, UR 004, UR 005 and UR 003. UR 002 is considered the head of the queue; UR 003 is considered the tail of the queue; and UR 001 (the top-level UR) is considered a header 302 of the queue. The header of the queue points to the head of the queue, but in this instance, is not considered a part of the queue. (In other embodiments, the whole family, including the header, may be placed on the queue. Further, the queue may include one or more queues.) Each cascaded UR of the queue points to the next cascaded UR, if any, by a forward pointer 304, and back to its parent UR via a parent pointer 306.

The depth-first order of the family tree structure is maintained when creating the queue. Thus, in order to create the queue, all of the children in one leg of the tree are placed on the queue, and then processing proceeds back up to the first split in the tree, which in this case is at the top-level UR. Then, the other leg of the tree is traversed. Thus, in the above example, the order from UR 001 is UR 002, followed by UR 004 and UR 005. Then, since UR 005 is the last child of a particular leg, processing continues up the tree until a split is found. A split is found at UR 001, and therefore, the other leg of the tree is traversed. This adds UR 003 to the queue.

One embodiment of the logic associated with creating a cascaded UR family queue is described with reference to FIGS. 4 and 5. In particular, FIG. 4 describes a process for adding a cascaded UR to the cascaded UR queue. This process begins with a UR below the top-level UR, since the top-level UR is the header of the queue and not considered a cascaded UR. FIG. 5 describes logic for locating the non-queued ancestors, as described below. In one example, the logic of these figures is performed by RRS.

Figure 4:
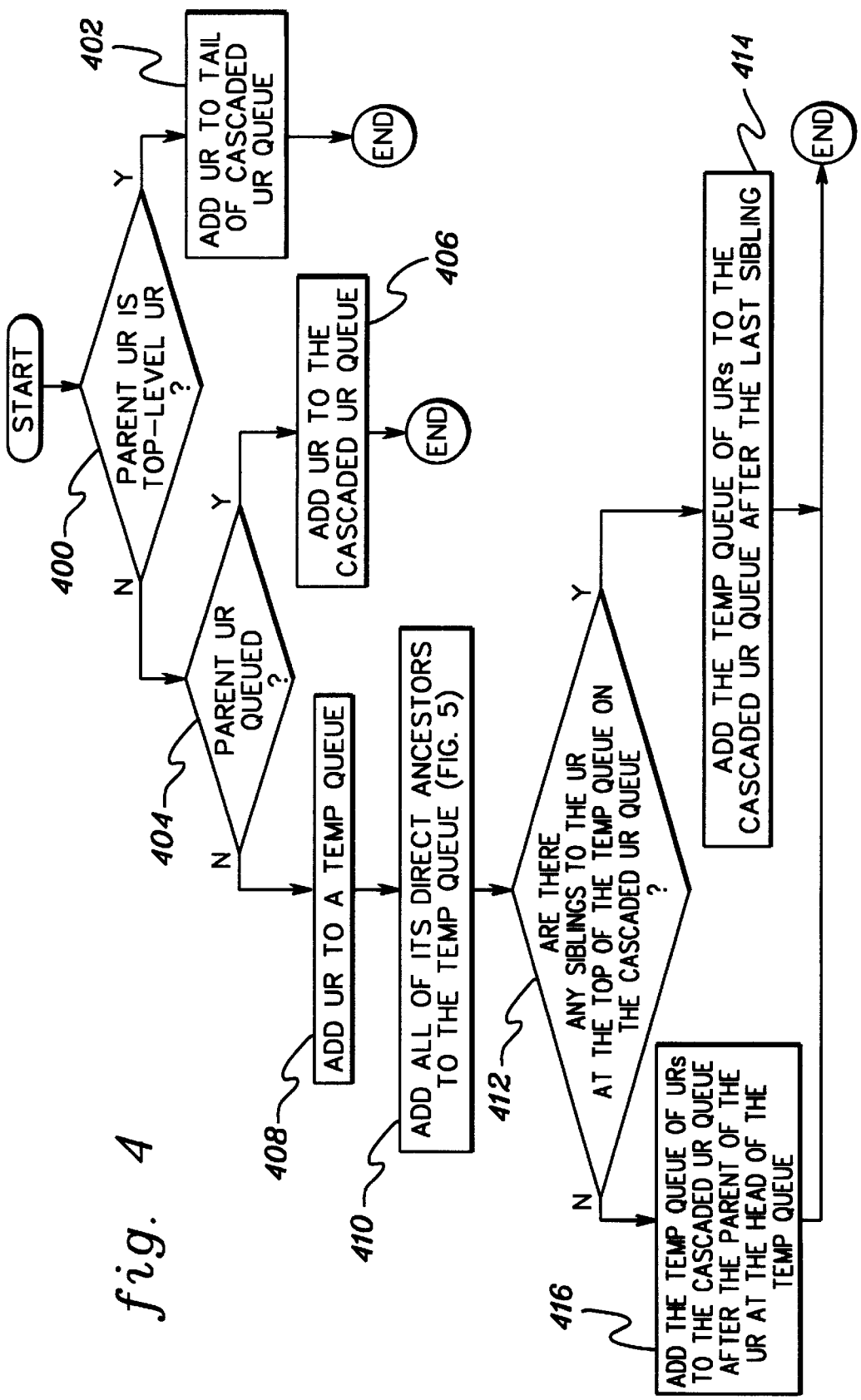
FIG. 4 depicts one embodiment of the logic associated with creating a cascaded UR tree, in accordance with an aspect of the present invention.
Figure 5:
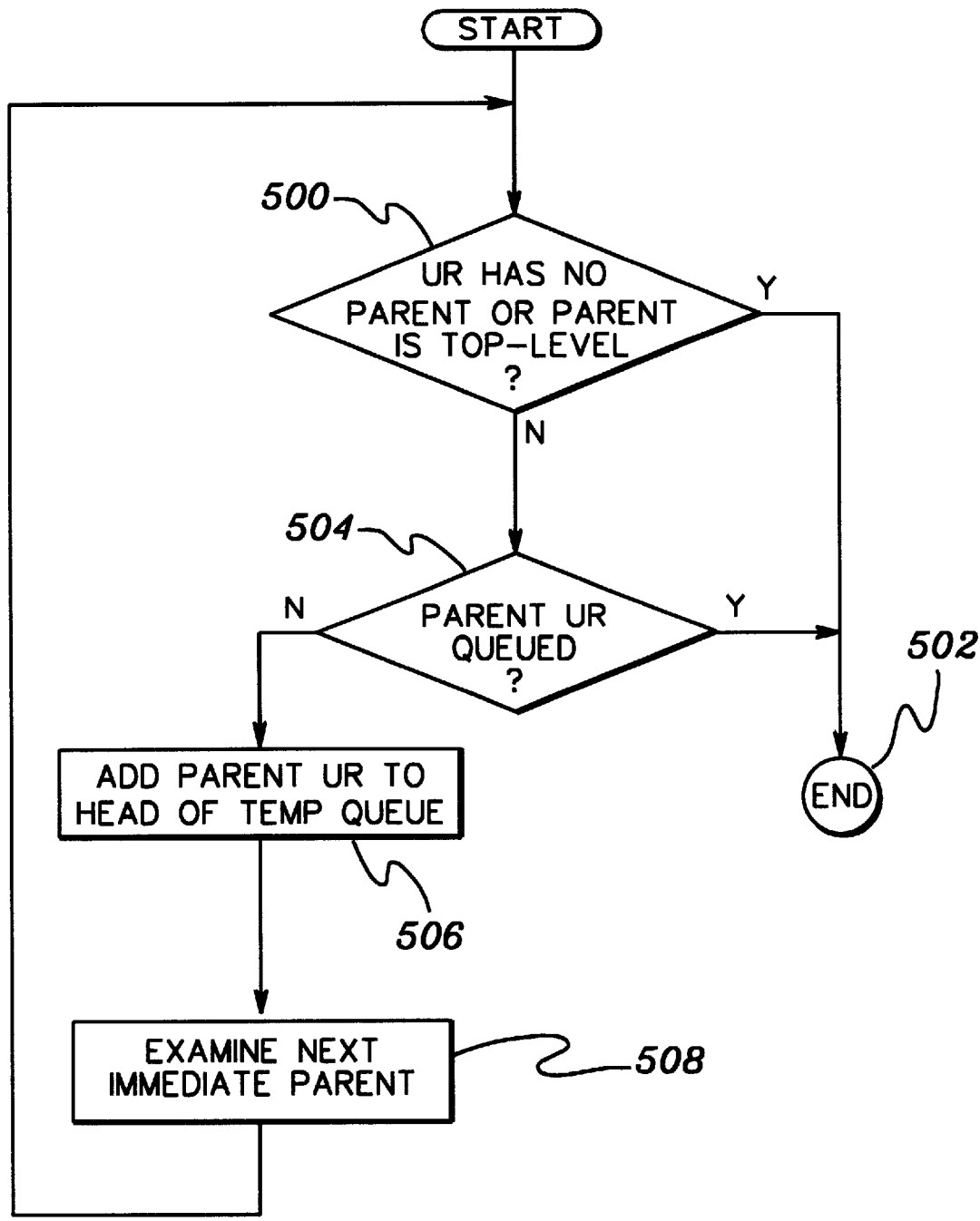
FIG. 5 depicts one embodiment of the logic associated with locating non-queued ancestors, in accordance with an aspect of the present invention.

Commencing with FIG. 4, initially, a determination is made as to whether the parent UR is a top-level UR, INQUIRY 400. In other words, is the parent of the UR to be added to the queue (e.g., UR 002) a top-level UR? If the parent UR is the top-level UR, then the UR (e.g., UR 002) is added to the tail of the cascaded UR queue, STEP 402. The header of the queue (e.g., UR 001) points to the head of the queue (e.g., UR 002), which has a parent pointer to its parent UR (e.g., UR 001).

However, if the parent UR (e.g., UR 002 for child UR 004) is not the top-level UR, then processing continues, as described herein. For example, a determination is made as to whether the parent UR (e.g., UR 002) is queued, INQUIRY 404. If it is queued, then the UR (e.g., UR 004) is added to the cascaded UR queue, STEP 406. In particular, the UR is added immediately following its last sibling, or if it has no sibling, then after its parent. On the other hand, if the parent of the UR is not yet queued, then the UR cannot be added to the cascaded UR queue, at this time. Thus, the UR is added to a temporary queue, STEP 408. Additionally, all of the UR's direct ancestors are also added to the temporary queue, STEP 410. One embodiment for adding ancestors to a temporary queue is described with reference to FIG. 5.

Referring to FIG. 5, initially, a determination is made as whether the UR to be added to the temporary queue has no parent or the parent is the top-level UR, INQUIRY 500. If the UR has no parent or the parent is top-level, then no ancestors need to be added to the temporary queue and processing is complete, STEP 502. On the other hand, if the UR has a parent, which is not the top-level parent, then a further determination is made as to whether the parent UR is queued, INQUIRY 504. If the parent UR is queued, then processing is complete, STEP 502. However, if the parent UR is not queued, then the parent UR is added to the head of the temporary queue, STEP 506. This parent UR is provided with a forward pointer to its child UR, and the child UR is provided with a parent pointer to its parent UR. Thereafter, the next immediate parent is examined, STEP 508, and processing continues as described herein.

Returning to FIG. 4, after the UR and its direct ancestors, which are not on the cascaded UR queue, have been added to the temporary queue, a determination is made as to whether there are any siblings to the UR at the top of the temporary queue on the cascaded UR queue, INQUIRY 412. If so, then the temporary queue of URs is added to the cascaded UR queue after the last sibling on the cascaded UR queue, STEP 414. Otherwise, the temporary queue of URs is added to the cascaded UR queue after the parent of the UR at the head of the temporary queue, STEP 416. This completes the creation of a cascaded UR family data structure.

The above queue creation processing helps maintain the depth-first order, especially if URs are being created in parallel. For example, if UR 002 is creating UR 004 and UR 004 is creating UR 005 in parallel, it is possible that creation of UR 005 completes before UR 004 is queued by UR 002. To maintain the depth-first order, the temporary queue is used to hold all of the immediate ancestors that are not already queued, as described above.

The cascaded UR queue is employed during syncpoint processing, in accordance with one aspect of the present invention. One example of syncpoint processing for a cascaded transaction is described with reference to FIGS. 6–10. In particular, initial syncpoint processing is described with reference to FIG. 6; syncpoint prepare phase processing is described with reference to FIG. 7; syncpoint in-doubt phase processing is described with reference to FIG. 8; syncpoint commit phase processing is described with reference to FIG. 9; and syncpoint backout processing is described with reference to FIG. 10. In one example, this processing is performed by the syncpoint manager (e.g., RRS) of the system executing the transaction. RRS's processing of a cascaded UR family syncpoint can be performed similarly to that of a single UR syncpoint with a similar total number of expressions of interest, since extra logging is avoided, in accordance with at least one aspect of the present invention.

Figure 6:
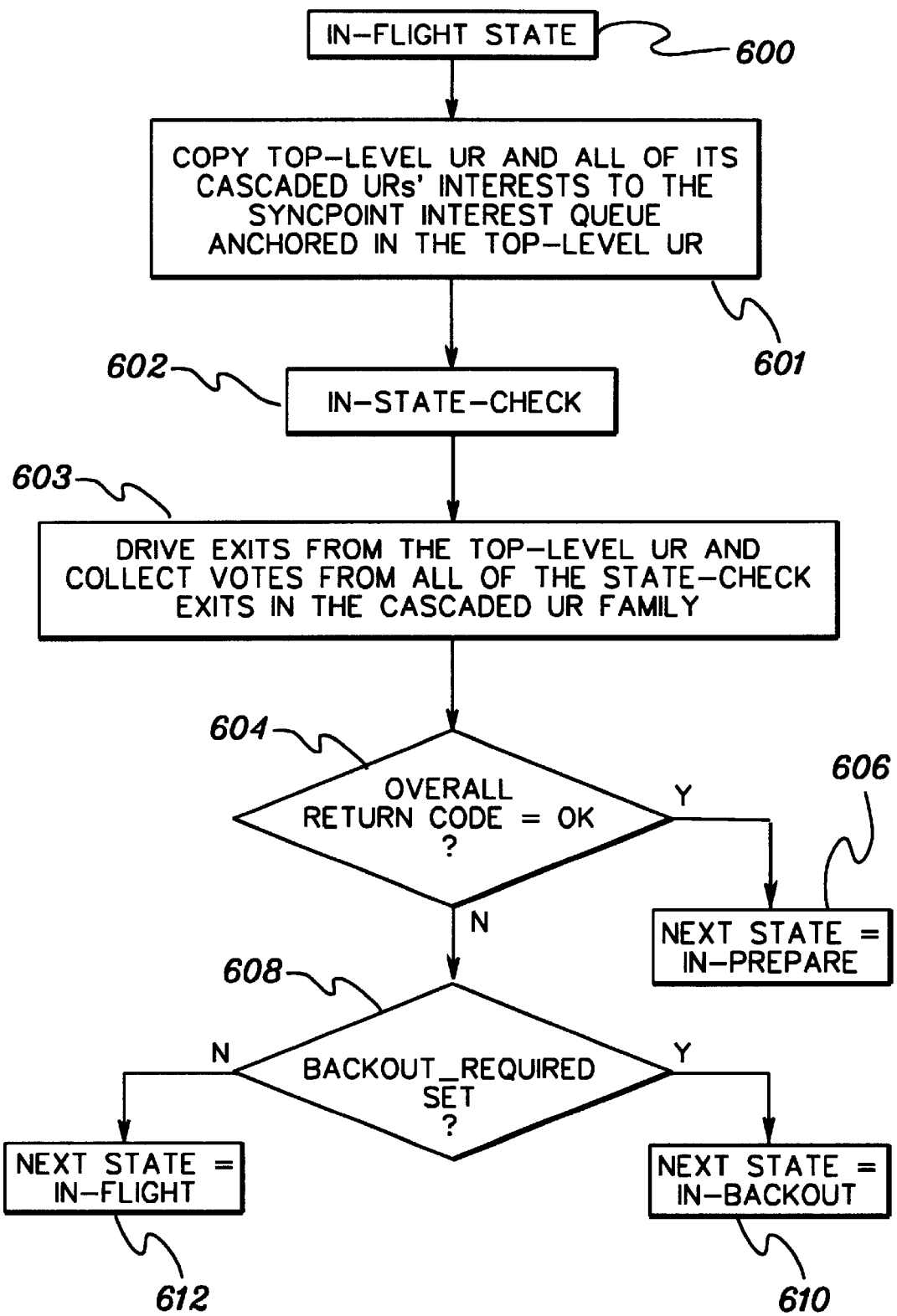
FIG. 6 depicts one embodiment of the logic associated with cascaded transaction syncpoint processing, in accordance with an aspect of the present invention.
Figure 7:
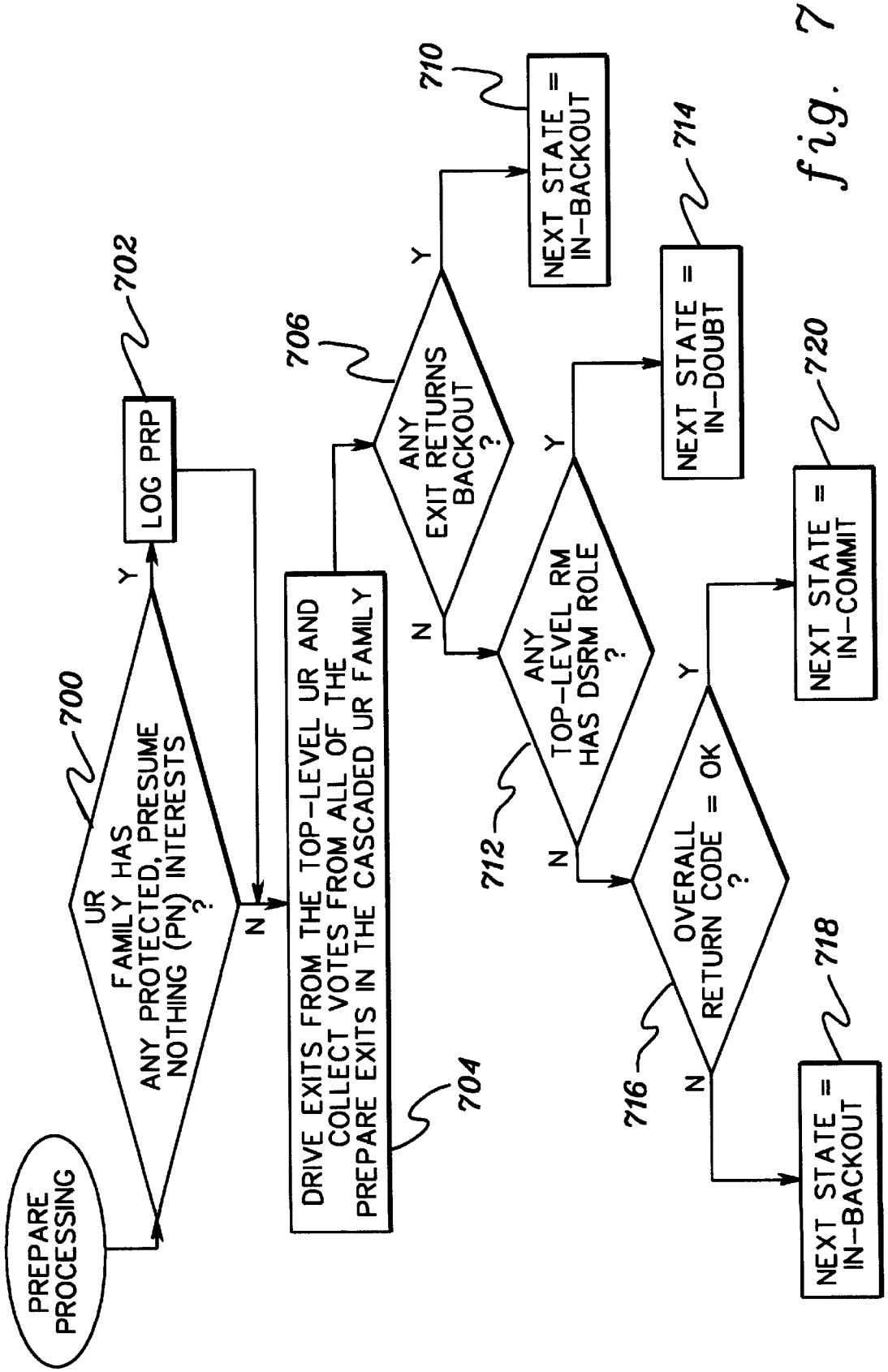
FIG. 7 depicts one embodiment of the logic associated with syncpoint prepare processing, in accordance with an aspect of the present invention.

Referring to FIG. 6, prior to starting syncpoint processing, the state of the units of recovery is in-flight, STEP 600. This is the UR state when an application accesses protected resources. The resource managers express interest in the units of recovery. Then, to begin syncpoint processing, the top-level UR's interests and all of its cascaded URs' interests are copied to the syncpoint interest queue (see FIG. 2*b*) anchored in the top-level UR, STEP 601. In particular, RRS flattens the transaction tree by copying all of the resource managers' interests in every UR of the cascaded UR family to the top-level UR in depth-first order.

At this point, the state of the units of recovery is in-state-check, indicating that the application has issued a commit request and the resource managers are to check if their resources are in the correct state, STEP 602. In accordance with one aspect of the present invention, the syncpoint manager of the top-level UR drives the in-state-check exits from the top-level UR for all of the URs' interests of the cascaded family tree, STEP 603. Since the URs are originally built in the cascaded tree order, the exits driving scheme can ensure that all exits belonging to a parent UR are driven before its child UR(s), thus maintaining the tree ordering.

The top-level UR collects votes from all of the state-check exits in the cascaded UR family. If the collected votes indicate that the overall return code is acceptable, INQUIRY 604, then the next state is set to in-prepare, STEP 606. This UR state indicates that the application has issued a commit request and the syncpoint manager is to tell each resource manager to prepare its resources for commit or backout.

However, if the overall return code indicates a problem, then a determination is made as to whether a backout is required, INQUIRY 608. If backout is required, then the next state is set to in-backout, STEP 610. The in-backout state is indicated when one or more resource managers have replied negatively to a commit request. The syncpoint manager tells each resource manager to backout the changes. Thus, the resources are returned to the values they had before the UR was processed. When all the resource managers have backed out the changes, the syncpoint manager notifies the application.

Returning to INQUIRY 608, if backout is not required, then the next state is in-flight, and application processing continues, STEP 612.

Processing associated with various of the UR states is described herein. For example, when the state is equal to in-prepare, then syncpoint prepare phase processing is performed. One example of this processing is described with reference to FIG. 7. Initially, a determination is made as to whether the UR family has any protected, presume nothing (PN) interests, INQUIRY 700. For RRS, presume nothing interests indicate that a prepare record is to be logged. In order to make this determination, the interests located in the syncpoint interest queue for the family are checked to see if any resource manager of an interest indicated presume nothing.

If the UR family has any protected, presume nothing interests, then a prepare record (PRP) is logged, STEP 702. In particular, a prepare record is written into the log. As one example, this record includes identifiers of the URs, type of log record (e.g., prepare state), and information about the presume nothing resource managers interested in the URs of the cascade. Thereafter, or if the UR family has no presume nothing interests, then prepare exits are driven the top-level UR to the resource managers of the URs. Further, the top-level UR collects votes from all of the prepare exits in the cascaded UR family, STEP 704.

If any exit returns a backout, INQUIRY 706, then the next state is set equal to in-backout, STEP 710. However, if no exit indicates a backout, then a determination is made as to whether any resource manager interested in the top-level UR has a distributed syncpoint resource manager (DSRM) role, INQUIRY 712. That is, a determination is made as to whether the top-level UR was created as an agent in a larger distributed transaction initiated using a peer-to-peer protocol. If a top-level resource manager has a DSRM role, then the next state is set equal to in-doubt, STEP 714. For a distributed request, the state of all the URs in the cascade is in-doubt on the agent systems from the end of the prepare phase of the two-phase commit until the DSRM returns a commit or backout request and that request is logged.

Returning to INQUIRY 712, if the top-level resource manager does not have a DSRM role, then a determination is made as to whether the overall return code is acceptable, INQUIRY 716. If the overall return code is not satisfactory, then the next state is set equal to in-backout, STEP 718. However, if the overall return code is equal to OK, then the next state is set equal to in-commit, STEP 720. This UR state is indicated when all resource managers reply positively to a commit request. The syncpoint manager tells each resource manager to make its changes permanent. When resource managers have made the changes, the syncpoint manager notifies the application.

Figure 8:
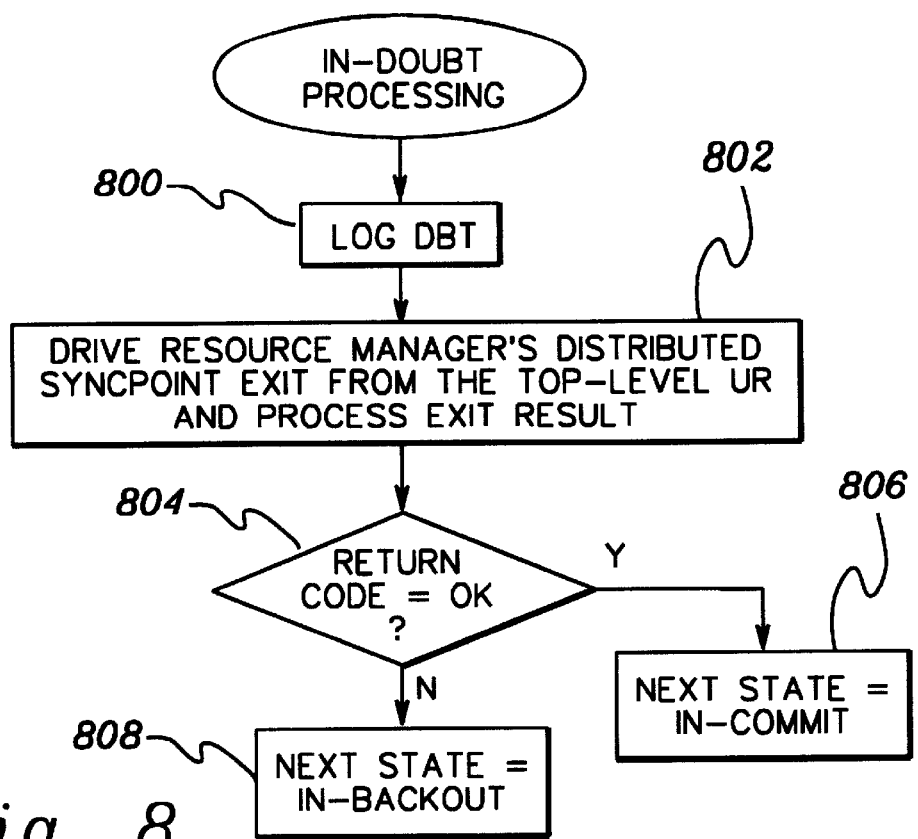
FIG. 8 depicts one embodiment of the logic associated with syncpoint in-doubt phase processing, in accordance with an aspect of the present invention.

One embodiment of the logic associated with syncpoint in-doubt phase processing is described with reference to FIG. 8. Initially, a doubt (DBT) log record is written to the log, STEP 800. Thereafter, the resource manager's distributed syncpoint exit is driven from the top-level UR, using the syncpoint manager of that UR, and the exit result is processed, STEP 802. If the exit result is satisfactory, then the next state equals in-commit, STEP 806. Otherwise, the next state equals in-backout, STEP 808.

Figure 9:
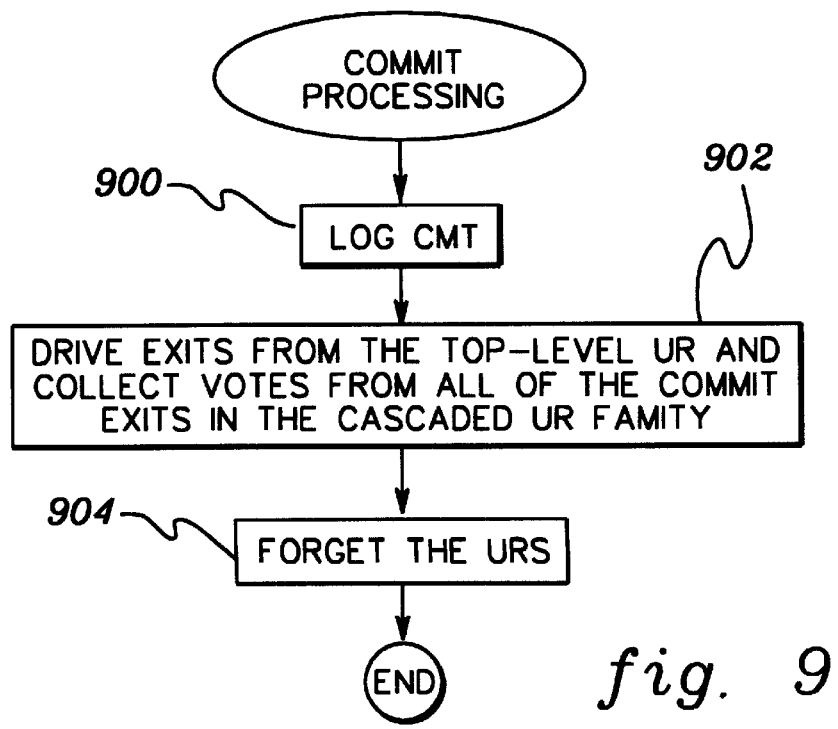
FIG. 9 depicts one embodiment of the logic associated with syncpoint commit phase processing, in accordance with an aspect of the present invention.
Figure 10:
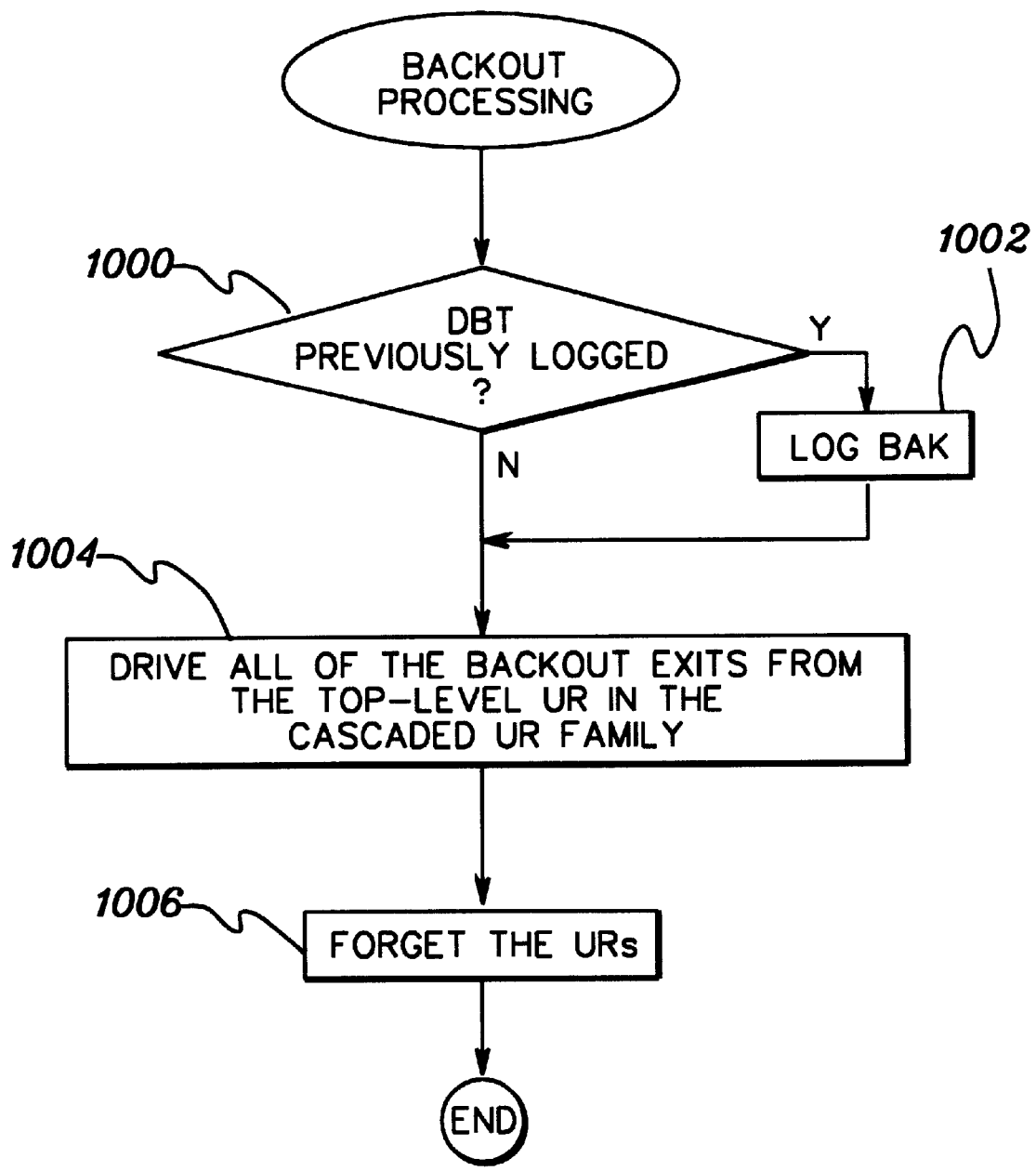
FIG. 10 depicts one embodiment of the logic associated with syncpoint backout processing, in accordance with an aspect of the present invention.

One embodiment of syncpoint commit phase processing is described with reference to FIG. 9. Initially, a commit (CMT) log record is written to the log, STEP 900.

Subsequently, exits are driven from the top-level UR (by the syncpoint manager) and votes are collected from all of the commit exits in the cascaded UR family, STEP 902. The URs are then cleaned-up, STEP 904. In order to clean-up the URs, in one example, control blocks associated with the URs are deleted. For example, entries are logically deleted from the log, as described in, for instance, U.S. Pat. No. 5,920,875, entitled "Tail Compression Of A Sparse Log Stream Of A Computer System," by Clark et al., issued Jul. 6, 1999;

and U.S. Pat. No. 5,999,935, entitled "Tail Compression Of A Sparse Log Stream Of A Multisystem Environment," by Clark et al., issued Dec. 7, 1999, each of which is hereby incorporated herein by reference in its entirety.

When a problem is encountered prior to commit processing, backout processing is performed. One embodiment of the logic associated with backout processing is described with reference to FIG. 10. Initially, a determination is made as to whether a doubt record was previously logged, INQUIRY 1000. If a doubt record has been logged, then a backout (BAK) record is also written to the log, in this example, STEP 1002. Thereafter, or if a doubt record has not been logged, then backout exits are driven from the top-level UR in the cascaded UR family, STEP 1004. Thereafter, the URs are cleaned-up, STEP 1006. This completes the backout processing.

In accordance with one aspect of the present invention, since all of the URs in a cascaded UR family are being managed as a group by RRS on a single system, RRS can, for purposes of syncpoint processing, treat an entire cascaded UR family as if it were a single UR. Thus, there is no need for RRS to log separate log records for each UR in the family. RRS can collect all of the responses from all of the exits for all of the URs' interests in the family. If the top-level UR does not have a DSRM or a server distributed syncpoint resource manager (SDSRM) role (in other words, it does not go in-doubt), RRS can immediately make the commit or backout decision and log only those records that are needed to record the final outcome. (SDSRM—Was the top-level UR created as an agent in a larger distributed transaction initiated using a client-server protocol?) If the top-level UR has a resource manager that has taken a DSRM or SDSRM role, RRS logs a doubt record, but it only has to log one doubt record for the entire cascaded UR family.

Further, since, in one example, all of the data for all of the URs involved in the family are logged by RRS as part of a single log record, multiple log blocks can be used to write the blocks of data.

The above-described syncpoint processing and logging capability advantageously enables RRS to collapse the tree into one logical transaction and to invoke the various resource managers of the tree (e.g., in whole or in part, in parallel) without cascading down each level of the tree. There is no need for the syncpoint managers of the transaction to communicate with one another to control the syncpoint processing, especially, since, in one instance, there is only one syncpoint manager controlling the syncpoint processing, a common log is shared, and access to common storage is provided. Thus, this protocol is referred to as a messageless protocol between units of recovery (or nodes) in a distributed transaction. The capability of the present invention provides improved performance in the two-phase commit process by reducing messaging overhead and reducing the number of log records written.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of performing syncpoint processing for distributed transactions of a computing environment, said method comprising:

executing a distributed transaction, said distributed transaction comprising a plurality of units of recovery; and performing syncpoint processing for at least a portion of said plurality of units of recovery, said at least a portion of said plurality of units of recovery comprising at least two units of recovery, said syncpoint processing being performed without passing messages between said at least a portion of said plurality of units of recovery.

2. The method of claim 1, wherein said performing syncpoint processing comprises employing a single unit of recovery of said plurality of units of recovery to represent said at least a portion of said plurality of units of recovery in the syncpoint processing.

3. The method of claim 2, wherein one syncpoint manager associated with said single unit of recovery controls said syncpoint processing for said at least a portion of said plurality of units of recovery.

4. The method of claim 2, wherein said employing comprises copying interests of said at least a portion of said plurality of units of recovery to said single unit of recovery to be used during said syncpoint processing.

5. The method of claim 2, wherein said employing comprises driving one or more exits from said single unit of recovery to at least initiate one or more phases of said syncpoint processing for said at least a portion of said plurality of units of recovery.

6. The method of claim 5, wherein said one or more exits comprise at least one of a state-check exit, a prepare exit, a syncpoint exit, a commit exit and a backout exit.

7. The method of claim 5, wherein said employing further comprises collecting, at said single unit of recovery, one or more votes for said at least a portion of said plurality of units of recovery, said one or more votes being responsive to said one or more exits.

8. The method of claim 2, wherein said at least a portion of said plurality of units of recovery comprise a cascaded unit of recovery family, and wherein said single unit of recovery is a top-level unit of recovery of said cascaded unit of recovery family.

9. The method of claim 8, further comprising creating a data structure representative of said cascaded unit of recovery family.

10. The method of claim 9, wherein said data structure is maintained in depth-first order.

11. The method of claim 1, wherein said syncpoint processing comprises writing a single log record for said at least a portion of said plurality of units of recovery.

12. The method of claim 1, wherein said at least a portion of said plurality of units of recovery are located locally on one system of said computing environment.

13. A method of performing syncpoint processing for distributed transactions of a computing environment, said method comprising:

executing a distributed transaction, said distributed transaction comprising a plurality of units of recovery; and performing syncpoint processing for at least a multiple of said plurality of units of recovery, wherein a single syncpoint manager of said computing environment controls said syncpoint processing for said at least a multiple of said plurality of units of recovery.

14. The method of claim 13, wherein said single syncpoint manager controls said syncpoint processing using a single unit of recovery of said plurality of units of recovery, and wherein said single unit of recovery represents said at least a multiple of said plurality of units of recovery.

15. A system of performing syncpoint processing for distributed transactions of a computing environment, said system comprising:

means for executing a distributed transaction, said distributed transaction comprising a plurality of units of recovery; and means for performing syncpoint processing for at least a portion of said plurality of units of recovery, said at least a portion of said plurality of units of recovery comprising at least two units of recovery, the syncpoint processing being performed without passing messages between said at least a portion of said plurality of units of recovery.

16. The system of claim 15, wherein said means for performing syncpoint processing comprises means for employing a single unit of recovery of said plurality of units of recovery to represent said at least a portion of said plurality of units of recovery in the syncpoint processing.

17. The system of claim 16, further comprising a syncpoint manager associated with said single unit of recovery, said syncpoint manager controlling said syncpoint processing for said at least a portion of said plurality of units of recovery.

18. The system of claim 16, wherein said means for employing comprises means for copying interests of said at least a portion of said plurality of units of recovery to said single unit of recovery to be used during the syncpoint processing.

19. The system of claim 16, wherein said means for employing comprises means for driving one or more exits from said single unit of recovery to at least initiate one or more phases of said syncpoint processing for said at least a portion of said plurality of units of recovery.

20. The system of claim 19, wherein said one or more exits comprise at least one of a state-check exit, a prepare exit, a syncpoint exit, a commit exit and a backout exit.

21. The system of claim 19, wherein said means for employing further comprises means for collecting, at said single unit of recovery, one or more votes for said at least a portion of said plurality of units of recovery, said one or more votes being responsive to said one or more exits.

22. The system of claim 16, wherein said at least a portion of said plurality of units of recovery comprise a cascaded unit of recovery family, and wherein said single unit of recovery is a top-level unit of recovery of said cascaded unit of recovery family.

23. The system of claim 22, further comprising means for creating a data structure representative of said cascaded unit of recovery family.

24. The system of claim 23, wherein said data structure is maintained in depth-first order.

25. The system of claim 15, wherein said means for performing syncpoint processing comprises means for writing a single log record for said at least a portion of said plurality of units of recovery.

26. The system of claim 15, wherein said at least a portion of said plurality of units of recovery are located locally on one system of said computing environment.

27. A system of controlling syncpoint processing for distributed transactions of a computing environment, said system comprising:

a computing system adapted to execute a distributed transaction, said distributed transaction comprising a plurality of units of recovery; and a single syncpoint manager of said computing environment adapted to control syncpoint processing for at least a multiple of units of recovery of said plurality of units of recovery.

28. The system of claim 27, wherein said single syncpoint manager controls said syncpoint processing using a single unit of recovery of said plurality of units of recovery, and wherein said single unit of recovery represents said at least a multiple of said plurality of units of recovery.

29. At least one program storage device readable by a machine, tangibly embodying at least one program of instructions executable by the machine to perform a method of performing syncpoint processing for distributed transactions of a computing environment, said method comprising:

executing a distributed transaction, said distributed transaction comprising a plurality of units of recovery; and performing syncpoint processing for at least a portion of said plurality of units of recovery, said at. least a portion of said plurality of units of recovery comprising at least two units of recovery, said syncpoint processing being performed without passing messages between said at least a portion of said plurality of units of recovery.

30. The at least one program storage device of claim 29, wherein said performing syncpoint processing comprises employing a single unit of recovery of said plurality of units of recovery to represent said at least a portion of said plurality of units of recovery in the syncpoint processing.

31. The at least one program storage device of claim 30, wherein one syncpoint manager associated with said single unit of recovery controls said syncpoint processing for said at least a portion of said plurality of units of recovery.

32. The at least one program storage device of claim 30, wherein said employing comprises copying interests of said at least a portion of said plurality of units of recovery to said single unit of recovery to be used during said syncpoint processing.

33. The at least one program storage device of claim 30, wherein said employing comprises driving one or more exits from said single unit of recovery to at least initiate one or more phases of said syncpoint processing for said at least a portion of said plurality of units of recovery.

34. The at least one program storage device of claim 33, wherein said one or more exits comprise at least one of a state-check exit, a prepare exit, a syncpoint exit, a commit exit and a backout exit.

35. The at least one program storage device of claim 33, wherein said employing further comprises collecting, at said single unit of recovery, one or more votes for said at least a portion of said plurality of units of recovery, said one or more votes being responsive to said one or more exits.

36. The at least one program storage device of claim 30, wherein said at least a portion of said plurality of units of recovery comprise a cascaded unit of recovery family, and wherein said single unit of recovery is a top-level unit of recovery of said cascaded unit of recovery family.

37. The at least one program storage device of claim 36, wherein said method further comprises creating a data structure representative of said cascaded unit of recovery family.

38. The at least one program storage device of claim 37, wherein said data structure is maintained in depth-first order.

39. The at least one program storage device of claim 29, wherein said syncpoint processing comprises writing a single log record for said at least a portion of said plurality of units of recovery.

40. The at least one program storage device of claim 29, wherein said at least a portion of said plurality of units of recovery are located locally on one system of said computing environment.

41. An article of manufacture, comprising:
at least one computer usable medium having computer readable program code means embodied therein for causing the performing of syncpoint processing for distributed transactions of a computing environment, the computer readable program code means in said article of manufacture comprising:
computer readable program code means for causing a computer to execute a distributed transaction, said distributed transaction comprising a plurality of units of recovery; and
computer readable program code means for causing a computer to perform syncpoint processing for at least a multiple of said plurality of units of recovery, wherein a single syncpoint manager of said computing environment controls said syncpoint processing for said at least a multiple of said plurality of units of recovery.

42. The article of manufacture of claim 41, wherein said single syncpoint manager controls said syncpoint processing using a single unit of recovery of said plurality of units of recovery, and wherein said single unit of recovery represents said at least a multiple of said plurality of units of recovery.

* * * * *

UNITED STATES PATENT AND TRADEMARK OFFICE
CERTIFICATE OF CORRECTION

PATENT NO.   : 6,490,595 B1
DATED        : December 3, 2002
INVENTOR(S)  : Candee et al.

It is certified that error appears in the above-identified patent and that said Letters Patent is hereby corrected as shown below:

<u>Column 4,</u>
Line 41, delete the "w" after the word "piece"

Signed and Sealed this

Thirteenth Day of May, 2003

JAMES E. ROGAN
*Director of the United States Patent and Trademark Office*